US012643989B2

(12) United States Patent
Wight

(10) Patent No.: US 12,643,989 B2
(45) Date of Patent: Jun. 2, 2026

(54) ANTIMICROBIAL MEDICAL GLOVE

(71) Applicant: BMG (British Medical Group) Limited, Cambridge (GB)

(72) Inventor: Paul Wight, Manchester (GB)

(73) Assignee: BMG (British Medical Group) Limited, Cambridge (GB)

( * ) Notice: Subject to any disclaimer, the term of this patent is extended or adjusted under 35 U.S.C. 154(b) by 1104 days.

(21) Appl. No.: 17/624,143

(22) PCT Filed: Jul. 1, 2020

(86) PCT No.: PCT/EP2020/068568
§ 371 (c)(1),
(2) Date: Dec. 30, 2021

(87) PCT Pub. No.: WO2021/001449
PCT Pub. Date: Jan. 7, 2021

(65) Prior Publication Data

US 2023/0147289 A1 May 11, 2023

(30) Foreign Application Priority Data

Jul. 1, 2019 (EP) .................................... 19183703

(51) Int. Cl.

| | |
|---|---|
| ***C08K 5/3417*** | (2006.01) |
| ***A41D 19/00*** | (2006.01) |
| ***B29C 41/14*** | (2006.01) |
| ***C08J 3/22*** | (2006.01) |
| ***C08K 5/12*** | (2006.01) |
| ***C09B 47/18*** | (2006.01) |
| *B29K 27/06* | (2006.01) |
| *B29K 105/00* | (2006.01) |
| *B29L 31/48* | (2006.01) |

(52) U.S. Cl.
CPC ........ *C08K 5/3417* (2013.01); *A41D 19/0055* (2013.01); *C08J 3/226* (2013.01); *C08K 5/12* (2013.01); *C09B 47/18* (2013.01); *B29C 41/14* (2013.01); *B29K 2027/06* (2013.01); *B29K 2105/0032* (2013.01); *B29K 2105/0038* (2013.01); *B29L 2031/4864* (2013.01); *C08J 2327/06* (2013.01); *C08K 2201/014* (2013.01)

(58) Field of Classification Search
CPC .. C08K 5/3417; C08K 5/12; C08K 2201/014; C09B 47/18; C08J 3/226; C08J 2327/06; B29K 2027/06; B29K 2105/0032; B29K 2105/0038; B29C 41/14; B29L 2031/4864; A41D 19/0055
USPC .......................................................... 524/569
See application file for complete search history.

(56) References Cited

U.S. PATENT DOCUMENTS

| | | | | |
|---|---|---|---|---|
| 5,486,274 | A | 1/1996 | Thetford et al. | |
| 12,049,095 | B2 | 7/2024 | Wight et al. | |
| 2003/0157150 | A1* | 8/2003 | Lee | C08K 5/0008 424/443 |
| 2009/0235429 | A1 | 9/2009 | Pickard et al. | |
| 2010/0221307 | A1 | 9/2010 | Matsushita et al. | |
| 2012/0056929 | A1 | 3/2012 | Sao et al. | |
| 2016/0058921 | A1 | 3/2016 | Gros | |
| 2016/0159992 | A1 | 6/2016 | Foo et al. | |
| 2018/0105710 | A1 | 4/2018 | Hong et al. | |
| 2022/0356364 | A1 | 11/2022 | Wight et al. | |
| 2022/0386724 | A1 | 12/2022 | Wilkinson et al. | |

FOREIGN PATENT DOCUMENTS

| | | | | |
|---|---|---|---|---|
| CN | 1189987 | A | 8/1998 | |
| CN | 104910553 | A | 9/2015 | |
| CN | 115464988 | A | 12/2022 | |
| EP | 0815880 | A2 | 1/1998 | |
| EP | 3213779 | A1 * | 9/2017 | A41D 19/0055 |
| JP | H05147127 | A | 6/1993 | |
| JP | 2005/009065 | A | 1/2005 | |
| JP | 2007/118252 | A | 5/2007 | |
| JP | 5885917 | B2 | 3/2016 | |
| WO | WO-93/00815 | A1 | 1/1993 | |
| WO | WO-98/30094 | A1 | 7/1998 | |
| WO | WO-99/49823 | A1 | 10/1999 | |
| WO | WO-2007/000473 | A1 | 1/2007 | |
| WO | WO-2010/118180 | A1 | 10/2010 | |
| WO | WO-2010/138426 | A1 | 12/2010 | |
| WO | WO-2015/154543 | A1 | 10/2015 | |
| WO | WO-2017/148957 | A1 | 9/2017 | |
| WO | WO-2018/091774 | A1 | 5/2018 | |

OTHER PUBLICATIONS

Extended European Search Report for EP Application No. 19183702.0 dated Feb. 6, 2020.
Extended European Search Report for EP Application No. 19183704.6 dated Jan. 8, 2020.
Extended European Search Report for EP Application No. 19187301.2 dated Jun. 26, 2020.
Hamdi et al., "Synthesis of Novel Antibacterial Metal Free and Metallophthalocyanines Appending With Four Peripheral Coumarin Derivatives and Their Separation of Structural Isomers," Heterocycles, 87(11): 2283 (2013).
International Search Report and Written Opinion and International Application No. PCT/EP2020/068558 dated Sep. 4, 2020.
International Search Report and Written Opinion and International Application No. PCT/EP2020/068559 dated Oct. 13, 2020.
International Search Report and Written Opinion and International Application No. PCT/EP2020/068562 dated Sep. 23, 2020.

(Continued)

*Primary Examiner* — Kelechi C Egwim

(74) *Attorney, Agent, or Firm* — Foley Hoag LLP; David P. Halstead; Alexander J. Chatterley

(57) ABSTRACT

A formulation for manufacturing an antimicrobial article, said formulation comprising 25 to 75 weight parts of a PVC resin; 20 to 40 weight parts of a plasticizer; 10 to 30 weight parts of a solvent diluent; 0.001 to 1% by weight, and preferably 0.001 to 0.3% by weight of a singlet oxygen generating dye.

8 Claims, 1 Drawing Sheet

(56) References Cited

OTHER PUBLICATIONS

Saki et al., "Synthesis and characterization of novel quaternized 2, 3-(diethylmethylamino)phenoxy tetrasubstituted Indium and Gallium phthalocyanines and comparison of their antimicrobial and antioxidant properties with different phthalocyanines," Inorganic Chemistry Communications, 95: 122-129 (2018).
U.S. Appl. No. 17/624,141, Published.
U.S. Appl. No. 17/624,146, Issued.
U.S. Appl. No. 17/624,154, Published.
Gaspard et al., "Studies on photoinactivation by various phthalocyanines of a free or replicating non-enveloped virus," Journal of Photochemistry and Photobiology B: Biology 31.3 (1995): 159-162.
Database WPI Week 201581 Thomson Scientific, London, GB; AN 2015-70932N XP0027996537 (2015).
Extended European Search Report for EP Application No. 19183703.8 dated Jan. 17, 2020.
International Search Report and Written Opinion and International Application No. PCT/EP2020/068568 dated Nov. 25, 2020.
Tanielian et al., "Effect of aggregation on the hematoporphyrin-sensitized production of singlet molecular oxygen." Photochemistry and Photobiology 61(2) (1995): 131-135.
Zhang et al., "Photophysical properties of nonperipherally and peripherally substituted triazatetrabenzcorrole phosphorous dihydroxy and singlet oxygen generation." Journal of Photochemistry and Photobiology A: Chemistry 215.1 (2010): 96-102.

* cited by examiner

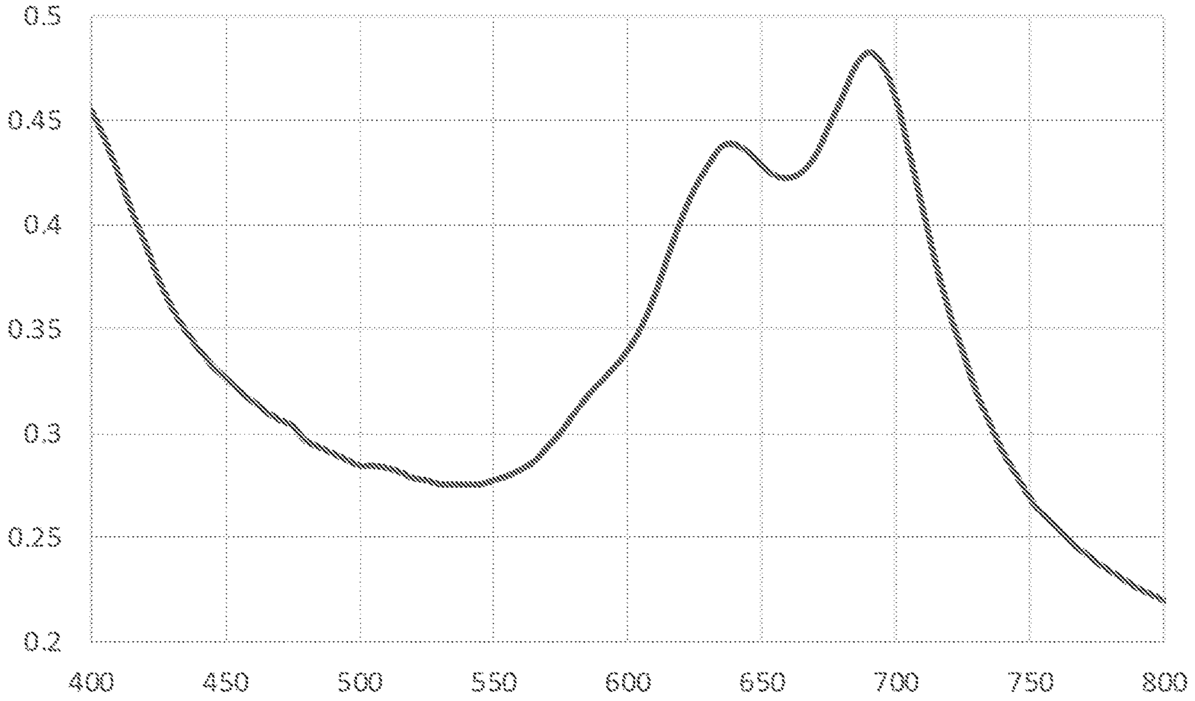
0.5
0.45
0.4
0.35
0.3
0.25
0.2
400
450
500
550
600
650
700
750
800

ANTIMICROBIAL MEDICAL GLOVE

CROSS-REFERENCE TO RELATED APPLICATION

This application is a National Stage Application of International Patent Application No. PCT/EP2020/068568, filed Jul. 1, 2020, which claims the benefit of European Application No.: 19183703.8, filed Jul. 1, 2019.

FIELD OF THE INVENTION

The present invention relates to a formulation and a process for manufacturing an antimicrobial article, and more particularly to a formulation and a process for manufacturing an antimicrobial glove.

BACKGROUND OF THE INVENTION

Protective gloves are widely used in hospitals, pharmaceutical plants, food plants, kitchens or even public places. Gloves are generally made of a polymer resin. For example, a so-called vinyl glove is produced by using polyvinyl chloride (PVC) as a main component.

Conventionally, the use of a protective glove isolates bacteria from a user's hand so as to reduce the risk of bacterial contamination. Since the bacteria attached to the surface of the glove are not killed, bacteria or other microbes may grow on the glove surface. Therefore, the glove might become a newly contaminating source.

It is desirable to provide continuous bacterial protection during use of a glove. For a purpose of achieving continuous bacterial protection, antimicrobial gloves are developed by dipping glove shapes in a PVC plastisol containing a PVC resin, an antimicrobial agent, a plasticizer and a stabilizer. In U.S. Pat. Nos. 5,888,441 and 5,906,823 examples of polymer resins, additives and methods for producing a glove are given. However, these gloves by necessity can leach biocidal materials into the environment. A non-leaching glove would have many advantages, including improved toxicity profile, and reduced likelihood of developing antimicrobial resistance. Sub lethal doses of biocides may be more likely to lead to antimicrobial resistance.

Generally, in order to obtain suitable physical properties of these gloves, for example thickness, strength, elasticity, deformation, etc., the PVC plastisol needs to be elaborately controlled before the dipping step is effected. In addition, according to the manufacturing processes of the prior art, the amount of the antimicrobial agent is limited to a low level (e.g. less than 1 weight percent) in order not to impair the physical properties of the gloves. As a result, the antimicrobial agent will diminish soon since the glove is used because it will gradually disappear from the glove surfaces and cannot be replenished.

Therefore, it is an object of the present invention to provide an antimicrobial article, preferably a glove, having a sustained antimicrobial effect and suitable physical properties.

SUMMARY OF THE INVENTION

The present invention provides a formulation for manufacturing an antimicrobial article. The formulation comprises 20-75 weight parts of a PVC resin, 20-40 weight parts of a plasticizer, 10-30 weight parts of a solvent diluent, 0.001 to 1% by weight of a dissolved singlet oxygen generating dye.

In an embodiment, the plasticizer blend comprises 20-75 parts of PVC and 20-40 parts of a plasticiser such as Bis(2-ethylhexyl) terephthalate, dioctyl phthalate (DOP), diisononyl phthalate (DINP), dioctyl terephthalate (DOTP), or butyl benzyl phthalate (BBP) and a combination thereof.

A second aspect of the present invention relates to a process for manufacturing an antimicrobial article. The process comprises incorporating the singlet oxygen generating dye into PVC and using the dyed PVC as a masterbatch concentrate to incorporate the dye onto the, dipping a shape of the article into the resulting mixture of the polymer plastisol and the singlet oxygen generating dye, and curing the mixture on the shape so as to form the article.

In an embodiment, the process further comprises a step of dissolving a water soluble dye into water and mixing the solution with PVC resin powder, after which the dye becomes incorporated into the PVC. Preferably the dye is partly water soluble partly solvent soluble. The PVC resin can then be filtered off or dried, and use as a concentrated masterbatch, by mixing with further PVC, plasiticiser, diluents and other formulants.

In a preferred embodiment, the article is a glove.

The above objects and advantages of the present invention will become even more readily apparent to those ordinarily skilled in the art after reviewing the following detailed description.

BRIEF DESCRIPTION OF THE FIGURES

FIG. 1 shows the uv-vis spectrum of a transparent film from 400 nm to 800 nm at 5 nm intervals in absorbance mode.

DETAILED DESCRIPTION

The plasticiser formulation suitable for manufacturing an antimicrobial article, preferably a glove, of the present invention comprises the following components: (a) 25 to 75 weight parts of a PVC resin; (b) 20 to 40 weight parts of a plasticizer; (c) 10 to 30 weight parts of a solvent diluent; (d) 0.0001 to 1% by weight, and preferably 0.001 to 0.3% by weight of a singlet oxygen generating dye. Other formulants including stabilisers and colorants can also be included.

The term "antimicrobial" used herein refers to the inhibition of the growth of bacteria or other microbes on a glove surface, or the killing of bacteria or other microbes on a glove surface. Such bacteria or other microbes include but not limited to *Staphylococcus aures*, *Enterococcus faecalis*, *E. coli*, *salmonella*, *listeria*, *Pseudomonas aeruginosa* and viruses such as influenza H1N1.

The plasticizer may be any known in the art including 2,2,4-trimethyl-1,3-pentanediol diisobutyrate (TXIB), dioctyl phthalate (DOP), diisononyl phthalate (DINP), dioctyl terephthalate (DOTP), butyl benzyl phthalate (BBP) and a combination thereof.

Further components can be added to the glove such as those known in the art, for example stabilisers, including Ca or Zn. The antimicrobial agent of the present invention is the singlet oxygen generating dye. Singlet oxygen generating dyes may be selected from methylene blue, or derivatives such as toluidine blue, Rose Bengal, zinc, aluminium or titanium phthalocyanines such as are available as Tinolux BBS and Tinolux BMC, or porphyrins. Preferred due to thermal stability are phthalcoyanines. Especially preferred are cationic phthalocyanines. More especially preferred are the partially solvent soluble, partly water soluble phthalocyanines with the following formula:

Formula 1

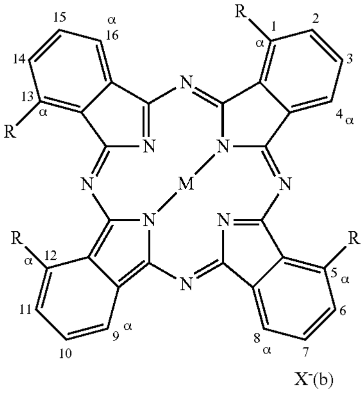

R = R′(a) or R″(b)
R′ oxygen linked pyridyl
R″ oxygen linked N-alklyated pyridinium wherein:

M is selected from aluminium or zinc,

R" is linked via an oxygen atom to a pyridine group at least 1 of which bears a cationic charge, and the remaining peripheral carbon atoms are an unsubstituted organic radical, a+b=4 b=1 to 3.9

X=$Cl^-$, $Br^-$, $I^-$, methanesulphonate, ethanesulphonate, formate, acetate or other inorganic or organic counter-ion or mixture thereof;

and wherein alkylation on the pyridine nitrogen is optionally branched C1-C8 alkyl.

The phthalocyanine may also have the formula:

Formula 4

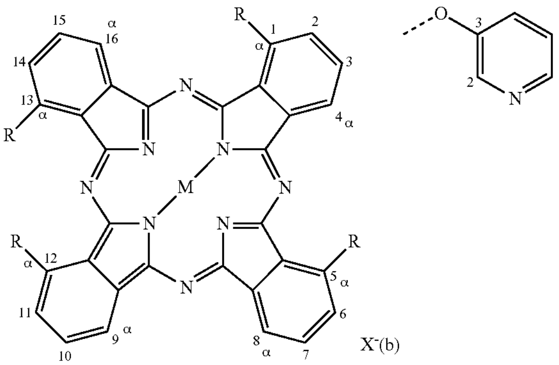

R′(a) or R″(b)
R′ 3-oxygen linked pyridyl
R″ 3-oxygen linked N-alklyated pyridinium Most preferred is wherein the dye is tetrapyridyloxy zinc pthalocyanine with the following formula:

Formula 5

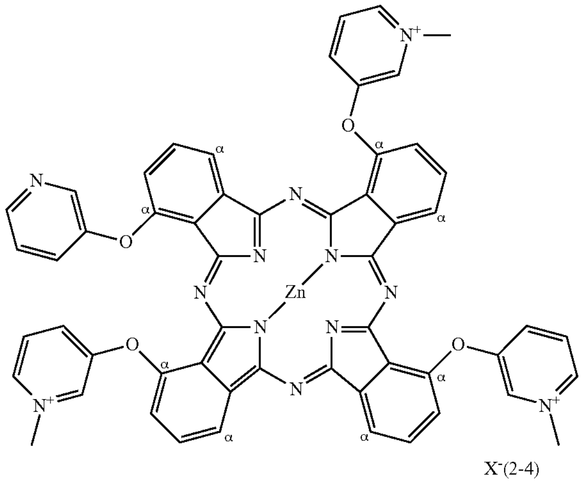

wherein the mean average total number of alkylated pyridines is 2 to 3, preferably 2.5 to 3.

Aluminium and zinc are chosen because they are more efficient in generating singlet oxygen than other metals such as copper or nickel, and they are reasonably small and so can be inserted into the phthalocyanine easily, with the reactions occurring under air, in good yield, as opposed to other metals such as using $SiCl_4$, and are easily available in bulk. The central metal atom also influences the position of the absorption maximum of the phthalocyanine, and zinc and aluminium are preferred in the compounds because their absorption is in the visible region of the spectrum especially between 600-700 nm. The zinc compounds described herein are especially preferred.

For the phthalocyanines of the present invention each of the pendant organic radicals linked via oxygen to the phthalocyanine nucleus is independently selected from N-alkylated pyridinium, such that any one phthalocyanine nucleus may carry two or more different organic radicals. Examples of N-alkylated pyridines are 3-hydroxy-1-methylpyridin-1-ium, 3-hydroxy-1-ethylpyridin-1-ium, 3-hydroxy-1-propylpyridin-1-ium.

Further, the phthalocyanines used in the present invention have substituents to the phthalocyanine nucleus in the alpha position, adjacent to the phthalocyanine nucleus. This alpha substitution decreases aggregation of the phthalocyanine. Aggregation is known to reduce singlet oxygen generation efficiency, and therefore this structure prevents aggregation and increases efficiency singlet oxygen generation and hence antimicrobial and other activity. In addition, after extensive research the present inventors have realised the molecules described herein have other desirable properties. They are more thermally stable, and stable to radical degradation than commercially available analogs such as Tinolux BBS and Tinolux BMC.

In the preferred group of such phthalocyanines, the total number of cationic substituents is 2 to 3.9, and more preferably 2.5 to 3.5. The compounds described herein may have a charge of at least +1, and up to +3.9, preferably +2 to +3.9 and most preferably +2.5 to +3.5. Suitable counter-ions for the N-alkylated pyridines include, but are not limited to, iodide, chloride, bromide, methanesulphonate, toluenesulphonate, acetate and hexafluorophosphide.

The phthalocyanines of Formula 1 can be prepared by reacting:

(1) a substituted 1,2-dicyanobenzene of Formula 2:

Formula 2

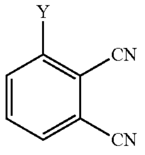

Y = F, Cl, BrI, $NO_2$ wherein Z is selected from chloro, bromo and iodo or nitro and is in the 3 position (alpha) to one of the CN groups, with (2) a compound pyridine-OH whereby the group Z, is replaced by pyridine-O groups to form a compound of Formula (3):

Formula 3

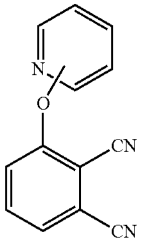

This can then be followed by reaction of one or more 1,2-dicyanobenzene compounds of Formula 3, or a combination of one or more compounds of Formula 3 and 1,2-dicyanobenzene, with an appropriate metal or metal salt optionally in an inert liquid at an elevated temperature to form a phthalocyanine of Formula 1.

Such reactions are fully described in GB 1489394, GB 2200650 and DE 2455675.

In the manufacturing process, the alkylation of the pyridine groups is done last. If the process is not done to completion, some of the pyridyl substituents can remain unalkylated and uncharged. The process can be modified by temperature and stoichiometry to give higher or lower degrees of final alkylation.

The antimicrobial agent used in the present invention may be activated by light and offers a sustained release of singlet oxygen from the glove. It is known that singlet oxygen is a strong antimicrobial agent to kill most bacteria. The advantage of singlet oxygen generating dyes is that they are catalytic and not exhausted over time, and the singlet oxygen they release is not persistent, due it its very short half-life of typically a few microseconds. This has major advantages in toxicity and potential for development of resistant organisms.

Conventionally, a glove is formed by using a conventional dipping process, i.e. by dipping a glove shape into a plastisol, removing the shape, and curing the plastisol, as described in U.S. Pat. No. 5,888,441.

The gloves manufactured from the present invention can provide effective and continuous antimicrobial protection. In addition, the physical properties of the glove are not significantly reduced.

Incorporating water soluble singlet oxygen generating dyes into a solvent based system such as PVC is especially challenging. The present invention has found a means to incorporate such dyes by first dissolving them in water. The solution is then stirred with PVC resin powder. During this process the dye is incorporated into the PVC. The PVC is polar, unlike the plasticiser or solvent diluent which are non-polar components used in making PVC articles and gloves. Water soluble dyes are not normally compatible with these non-polar components. By incorporating the water soluble dye into the PVC first, the present invention is able to add water soluble singlet oxygen generating dyes into a solvent based article such as PVC gloves.

While the invention has been described in terms of what is presently considered to be the most practical and preferred embodiments, it is to be understood that the invention needs not be limited to the disclosed embodiments. On the contrary, it is intended to cover various modifications and similar arrangements included within scope of the appended claims which are to be accorded with the broadest interpretation so as to encompass all such modifications and similar structures.

The present invention will now be illustrated, but in no way limited, by reference to the following example.

Example 1

1 g of dye Formula 1 is dissolved in 400 ml of water. 100 g of PVC powder are added with stirring. After 1 hour, the dye solid is filtered off. The dyed PVC (80 g) was added to a further 320 g of PVC powder, and 260 of dioctylphthalate added. 130 g of DN300 diluent, from DYNAMIC CHEMICAL BINHAI INDUSTRY CO., LTD, CAS:6846-50-0, was added and the mixture stirred for 1 hour. Glove formers were dipped in the liquid and dried in an oven at 180° C. for 3 minutes.

The film was transparent and so was analysed by uv-vis, in a Hach-DR3900 spectrophotometer, by placing the film in the beam path, running the spectrum from 400 nm to 800 nm at 5 nm intervals in Absorbance mode, which showed the dye predominantly in a monomeric form (absorption at 680 nm is the monomeric form of the dye) (FIG. 1). The peak at 680 nm is the monomer, that at 640 nm is from the aggregated form of the phthalocyanine.

The resulting film was tested for antimicrobial activity by ASTM D7907.

| | 5 Minutes | | |
|---|---|---|---|
| Organism | Average Count Recovery (cfu/device) | Log Count | Log Reduction |
| *Staphylococcus aureus* | 3.5E1 | 1.54 | 4.44 |
| *Enterococcus faecalis* | 1.0E1 | 1.00 | 5.00 |

The invention claimed is:

1. A formulation for manufacturing an antimicrobial article, said formulation comprising:

25 to 75 weight parts of a PVC resin;

20 to 40 weight parts of a plasticizer;

10 to 30 weight parts of a non-polar solvent diluent; and 0.001 to 1% by weight of a water soluble singlet oxygen generating dye.

2. The formulation according to claim 1, wherein the dye is selected from Methylene Blue, Toluidine Blue, Rose Bengal, zinc phthalocyanines, aluminium phthalocyanines, titanium phthalocyanines, and porphyrins.

3. The formulation according to claim 1, wherein the dye has both water and solvent solubility.

4. The formulation according to claim 1, wherein the dye has the following structural formula:

Formula 1

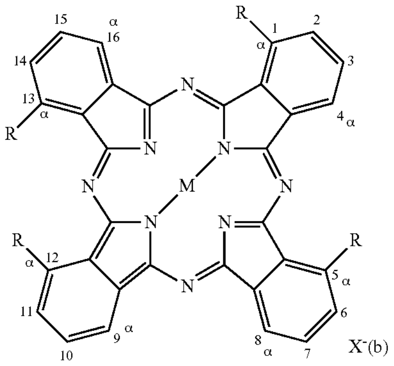

R = R′(a) or R″(b)
R′ oxygen linked pyridyl
R″ oxygen linked N-alklyated pyridinium wherein:

M is selected from aluminium or zinc,

R" is linked via an oxygen atom to a pyridine group at least 1 of which bears a cationic charge, and the remaining peripheral carbon atoms are an unsubstituted organic radical, a+b=4 b=1 to 3.9

X=$Cl^-$, $Br^-$, $I^-$, methanesulphonate, ethanesulphonate, formate, acetate or other inorganic or organic counter-ion or mixture thereof; and wherein alkylation on the pyridine nitrogen is optionally branched C1-C8 alkyl.

5. The formulation according to claim 4, wherein the dye has the following formula:

Formula 4

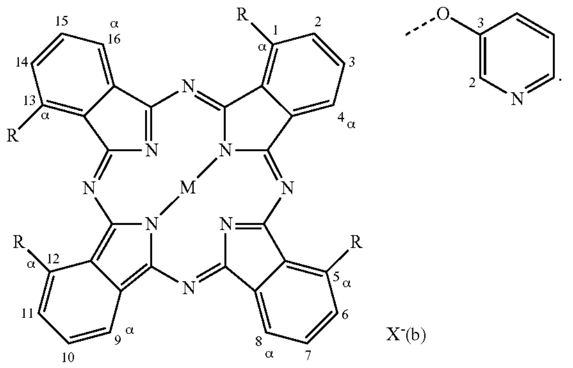

R′(a) or R″(b)
R′ 3-oxygen linked pyridyl
R″ 3-oxygen linked N-alklyated pyridinium

6. The formulation according to claim 4, wherein the dye is tetrapyridyloxy zinc pthalocyanine with the following formula:

Formula 5

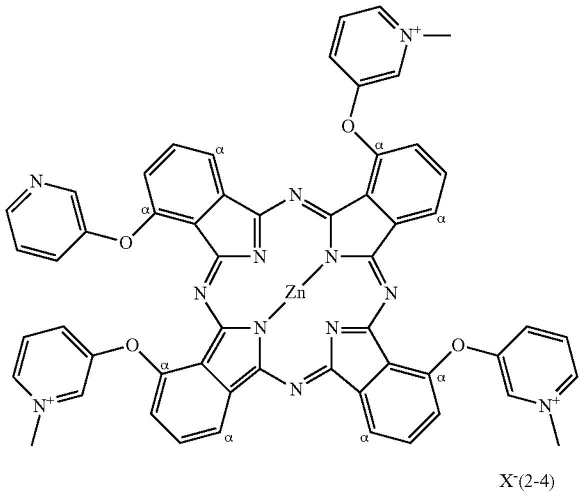

wherein the mean average total number of alkylated pyridines is 2 to 3.

7. The formulation according to claim 6, wherein the mean average total number of alkylated pyridines is 2.5 to 3.

8. The formulation according to claim 1, comprising from 0.001 to 0.3% by weight of a singlet oxygen generating dye.

* * * * *